Figure 3:
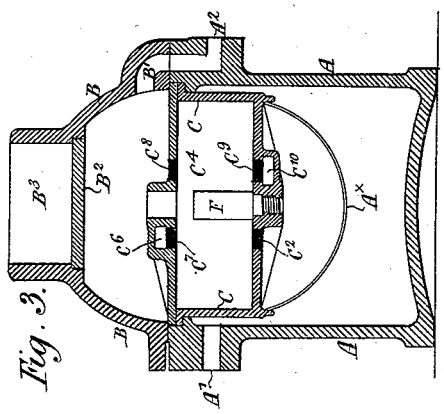

(No Model.)

W. G. KENT.
ROTARY METER.

No. 361,529. Patented Apr. 19, 1887.

UNITED STATES PATENT OFFICE.

WALTER G. KENT, OF 199 HIGH HOLBORN, COUNTY OF MIDDLESEX, ENGLAND.

ROTARY METER.

SPECIFICATION forming part of Letters Patent No. 361,529, dated April 19, 1887.

Application filed July 26, 1886. Serial No. 209,135. (No model.)

*To all whom it may concern:*

Be it known that I, WALTER GEORGE KENT, a subject of the Queen of Great Britain, residing at 199 High Holborn, in the county of Middlesex, England, manufacturer, have invented certain new and useful Improvements in or relating to Meters for Measuring Liquids, of which the following is a specification.

This invention has for its object an improved water or liquid meter. This meter is an improvement on that patented in the United State of America by Frank Walker, of Tombstone, Arizona Territory, assignor to the Keystone Water Meter Manufacturing Company, (Limited,) of Pennsylvania, on the 15th day of July, 1884, No. 302,179.

My improvement, hereinafter specified by the claims, relates to a meter of the class in which, instead of connecting the supply-pipe directly to the inlet-chamber of the meter and the delivery-pipe directly to the outlet-chamber, a separate casing is provided. It is in two parts, and the supply and delivery pipes are permanently fixed to the lower part. The upper part is domed and fits onto the lower part as a cover and is readily movable. The body of the meter is received into the lower part, and forms a partition between the interior capacity of this part and the cavity in the upper part or cover.

The body of the meter is cylindrical, and so, also, is the casing which receives it. There is a small annular space between them, and with this the inlet-pipe is connected by a radial aperture through the side of the casing. Thus any rush of the inlet-water is effectually broken. The delivery-pipe, although attached to the lower part of the casing, does not communicate with its interior cavity, but with a passage terminating in an aperture in its flange. In the flange of the cover there is a corresponding aperture, which is the mouth of an outlet-passage in connection with the cavity of the cover. The water ascends within the lower part of the casing through a strainer attached beneath the body of the meter. It enters the body of the meter through apertures in the bottom. It then traverses the working-chamber, and so finds its way into the cavity of the cover and passes away by the delivery-pipe.

I improve the working of the meter, rendering the flow more uniform and thereby avoiding shocks, and also preventing jamming of the piston by grit, which in the original form may occur, by somewhat altering the interior form of the working-chamber.

In the meter described in the former specification to which I have referred, (No. 302,179,) the working-chamber is so formed that the part termed the "piston" makes one-half of a rotation about the central post or stud and then moves radially upon the post or stud, and the form of the case and piston is such as to permit of no other movement. I now make the part of the case on which the end of the piston abuts shortly before the piston completes its semi-rotation of such a form as to compel the commencement of the radial movement when the piston comes into contact with this part, and I also make the side of the piston so that it becomes free for the radial movement before the end of the rotary movement, in place of the piston being retained, as heretofore, until the rotary movement is fully completed.

In order that my said invention may be fully understood and readily carried into effect, I will proceed to describe the drawings hereunto annexed.

Figure 4:
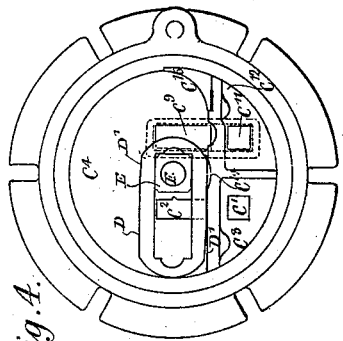
Figure 5:
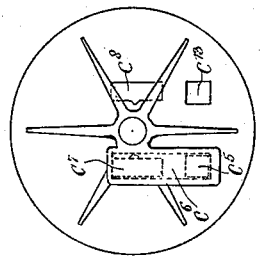
Figure 1:
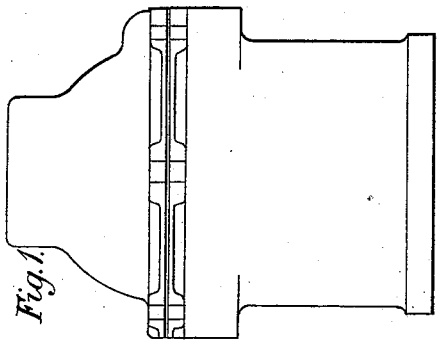
Figure 2:
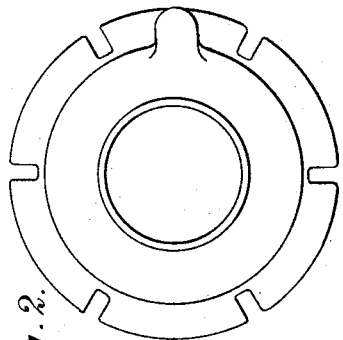

In the drawings, Figure 1 is an elevation of the improved water or liquid meter. Fig. 2 is a plan of the same. Fig. 3 is a vertical section of the same with the piston and counter removed. Fig. 4 is a plan with the cover of the casing and the top plate of the body of the meter removed. Fig. 5 is a plan of the top plate.

A is the lower cylindrical part of the casing of the meter. The inlet-passage is at A', and the delivery-passage at A$^2$. Pipe-connections are made with the passages A' and A$^2$ in any convenient way.

B is the domed upper part of the casing. Its interior capacity is placed in communication by a passage, B', with the delivery-passage A$^2$ of the lower part of the casing.

B$^2$ is a plate on which the ordinary counter is built. The indicating wheels or disks are on the upper side of the plate B$^2$, and are contained in the cavity B$^3$. This cavity is provided with a cover. One of the axes of the counting-train passes through a gland or water-tight joint in the plate $B^2$.

C is the cylindrical body of the meter. It is flanged and the flange is received into a recess in the top of the part A, so that when the parts are in place and the cover bolted on the body of the meter forms a partition separating a lower cavity in the part A from an upper cavity in the part B. The water entering at A' strikes upon the body C, divides, and passes around it. It also slowly descends around the walls of the casing A, and it then rises again through the perforated strainer $A^×$. These conditions are very favorable to the deposit of grit at the bottom of the casing in preference to carrying it forward into the body of the meter.

The water enters the body of the meter by the holes $C'$ and $C^2$. The first of these opens into a chamber, $C^3$, called the "inlet-chamber," and the latter into a chamber, $C^4$, called the "working-chamber." The water also simultaneously passes into the working-chamber by way of the inlet-chamber $C^3$, the aperture $C^5$, the passage $C^6$, and aperture $C^7$, for, as heretofore, admission both above and below the piston is provided. The water escapes from the working-chamber into the cavity of the cover B directly by the hole $C^8$, and also simultaneously by the lower aperture, $C^9$, the passage $C^{10}$, the opening $C^{11}$ in the bottom of a chamber, $C^{12}$, called the "outlet-chamber," and by a hole, $C^{13}$, in the top of this chamber. Thus the exit also takes place, as heretofore, both above and below the piston.

D is the part called the "piston." It is hollow and its end abuts on the semi-cylindrical wall of the working-chamber. The piston is also controlled by the block E, fitted into the hollow or slot formed through the piston, and by a central fixed post or stud, F, which passes through the block.

As seen in Fig. 4, the piston has just terminated its radial movement and is about to commence its rotary motion. It is lying against the wall of the inlet-chamber $C^3$, and the water is able to penetrate, by means of small ports provided in the piston, from the apertures $C^2$ and $C^7$ in between the piston and the wall. The pressure at which the water is supplied causes rotary movement of the piston. As the piston travels round one end is kept in contact with the curved wall of the working-chamber by the other end abutting in the cavity at $C^{14}$. During the movement of the piston the water in front of it is swept out of the working-chamber through the apertures $C^8$ and $C^9$. This goes on until the one end of the piston in the last part of its rotary movement comes to abut upon the incline $C^{15}$, and at the same time the other end of the piston, which is beveled off at D', escapes from the cavity $C^{14}$. The piston then for a short distance has a compound movement. It moves radially while it finishes its travel around the stud or post F. The radial traverse of the piston is caused, as before, by the entrance of water into the interior of the piston from the ports $C^2$ and $C^7$ on one side of the stud or post F, while on the other side water is expelled from it by the ports $C^8$ and $C^9$; but now the ports are well open to the interior of the piston before the flow from them in the working-chamber is checked.

The arrangement above described, it will be observed, admits of the entire body of the meter being removed whenever necessary without breaking any of the service-connections. This having been done, a new body can be inserted and the case again closed. The arrangement also possesses other advantages, to which attention has been directed.

I claim—

1. The combination of the casing A with its passages A' and $A^2$, the cover B, provided with the cavity and the delivery-passage B', the body C, having the holes at top and bottom and containing the working-chamber and forming a partition between the cavity in the casing and the cavity in the cover, and the hollow or slotted radially-moving and rotating piston D in the working-chamber, these parts being and operating substantially as set forth, whereby water entering at A' into the annular space between the casing and the body descends around the body, turns inward, ascends by the holes in the bottom of the body into the working chamber, imparts radial and rotary motion to the piston, passes out by the holes in the top of the body into the cavity of the cover, and thence away by the passages in the cover and casing.

2. The combination of the body C with its inlet and outlet passages and its working-chamber $C^4$, the hollow piston D, the post or stud F, and the incline $C^{15}$, causing radial motion of the piston before the termination of its rotary motion, substantially as described.

WALTER G. KENT.

Witnesses:
WALTER J. SKERTEN,
G. F. WARREN,
Both of 17 Gracechurch Street, London, E. C.